UNITED STATES PATENT OFFICE.

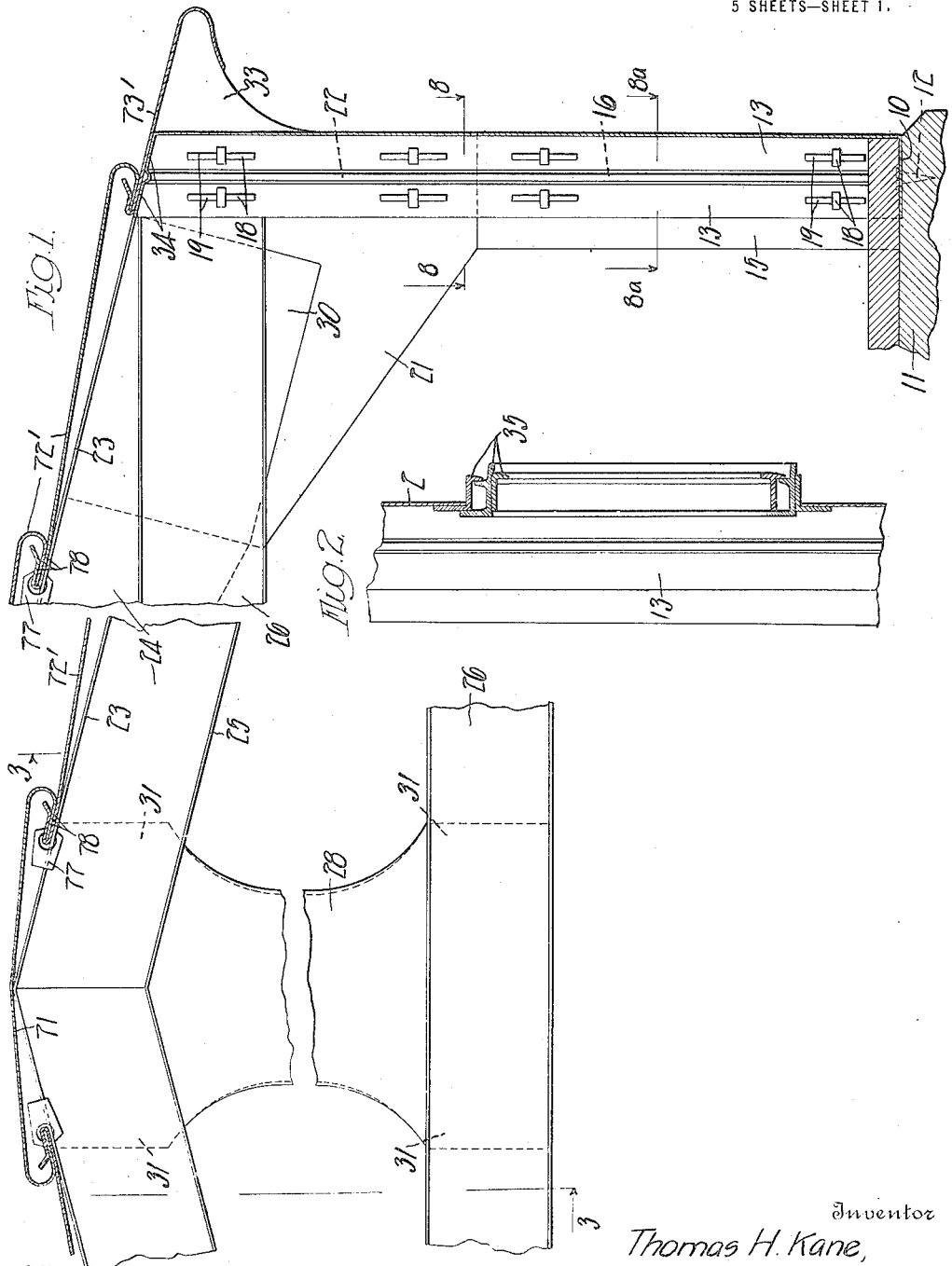

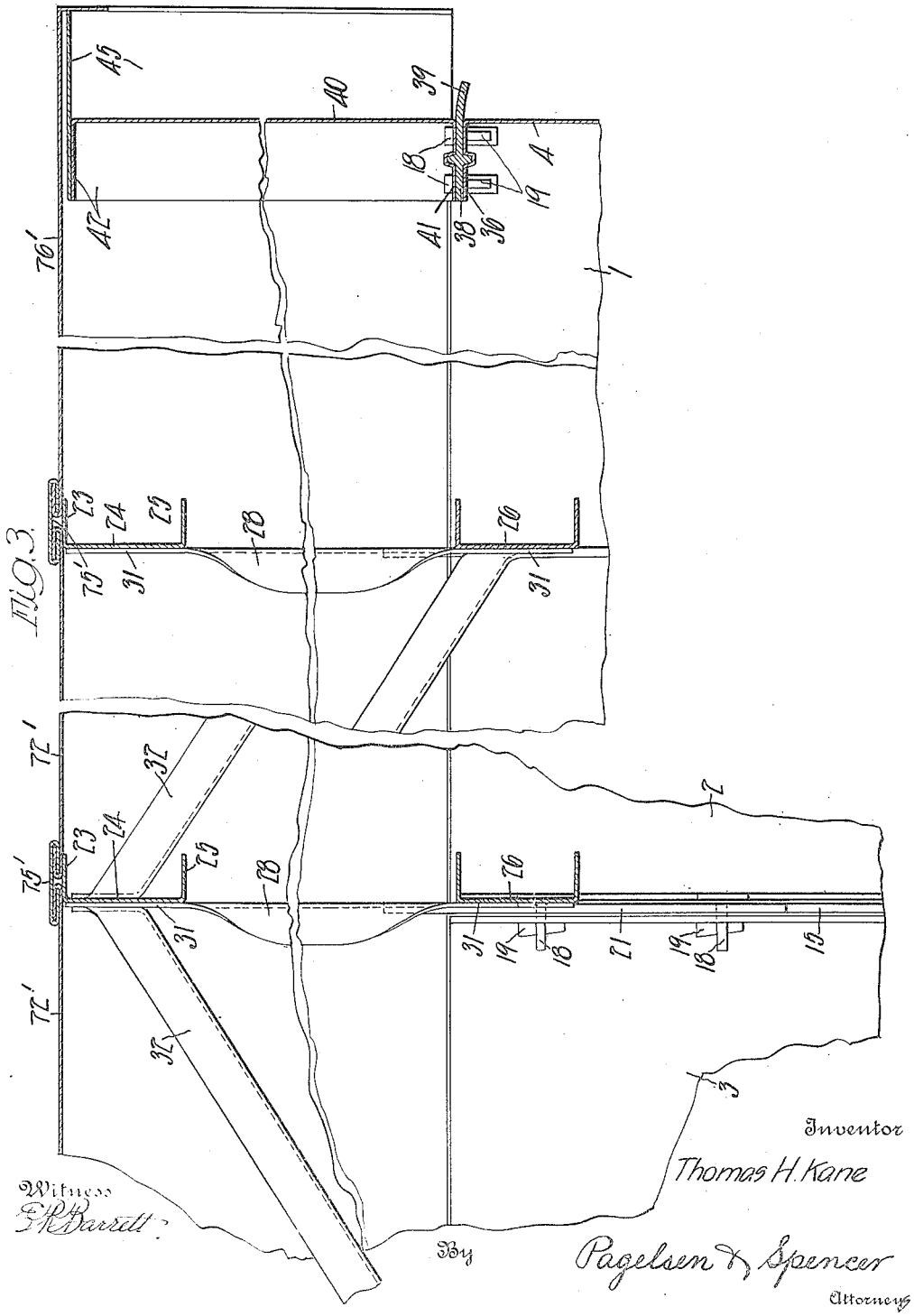

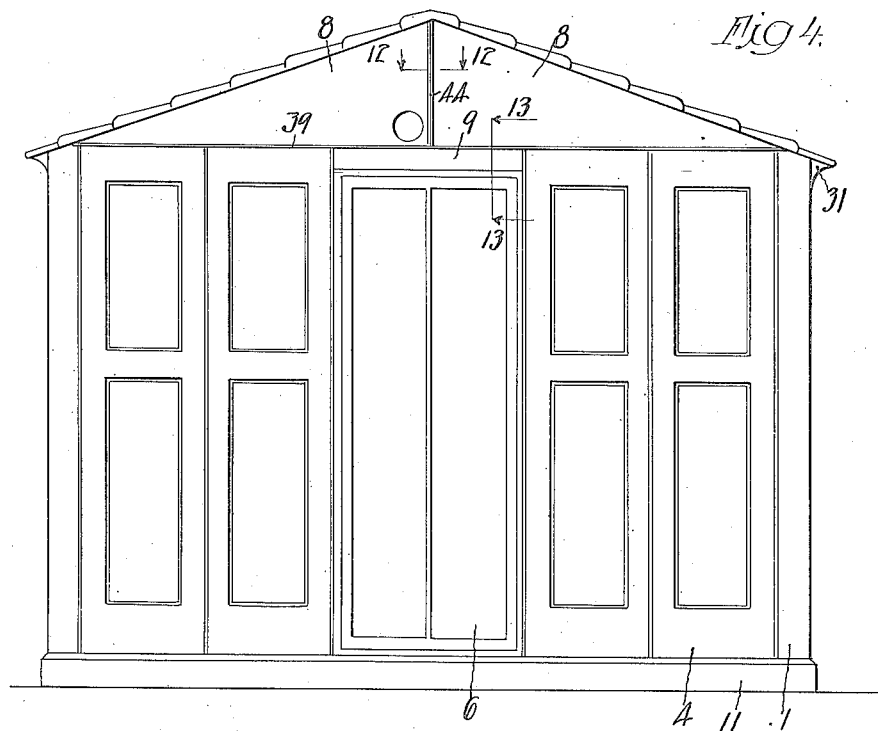
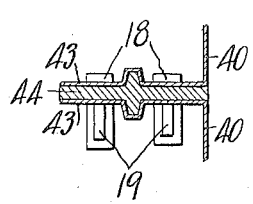
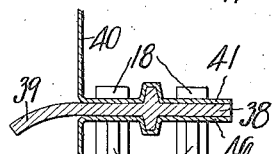
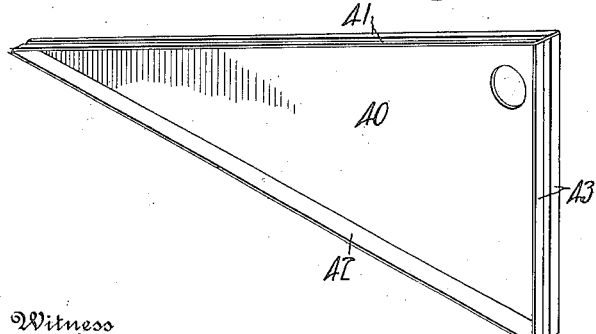
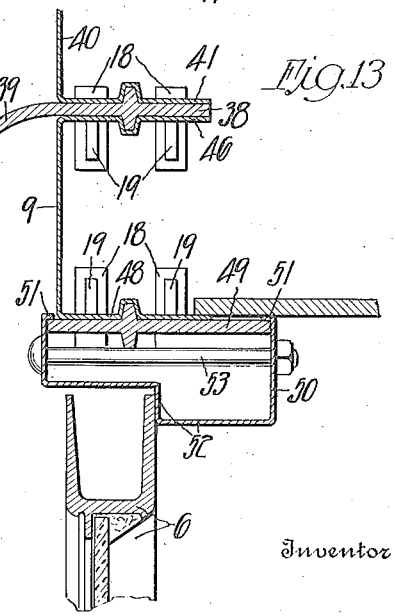

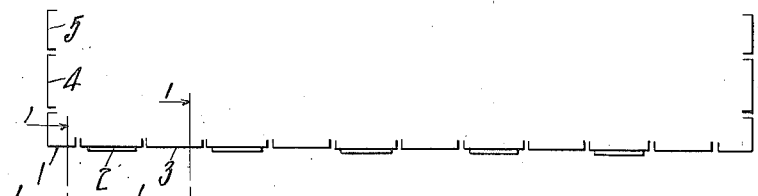
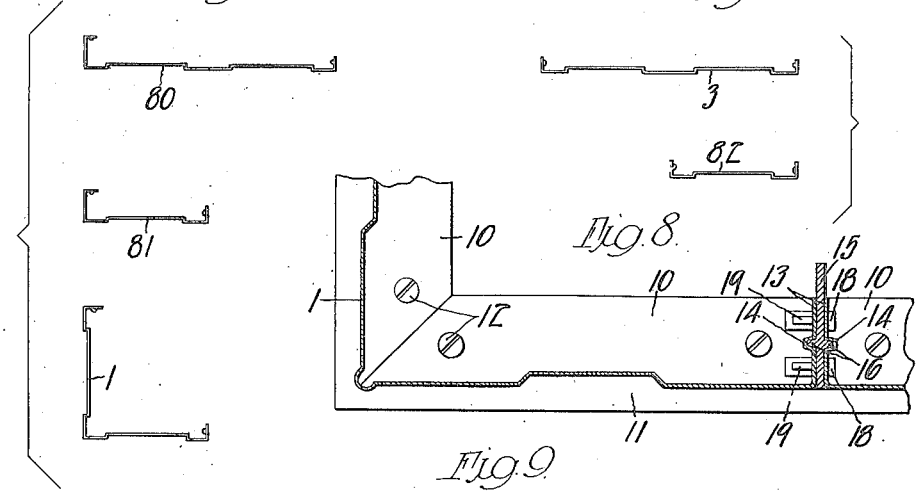
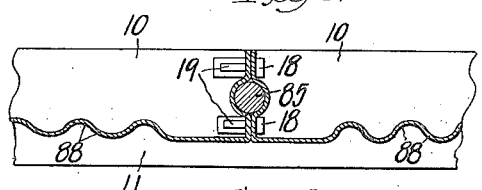
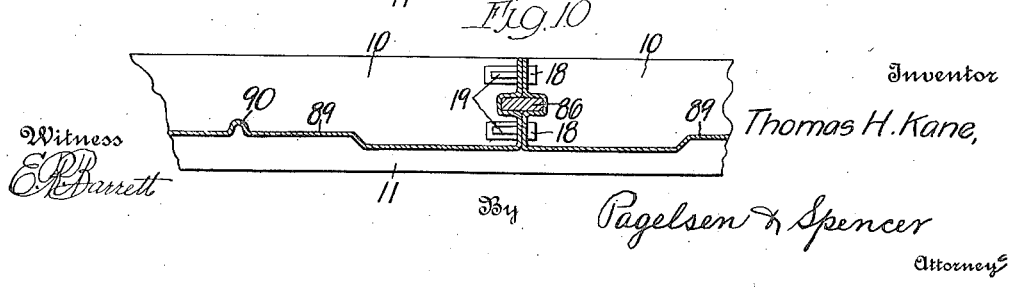

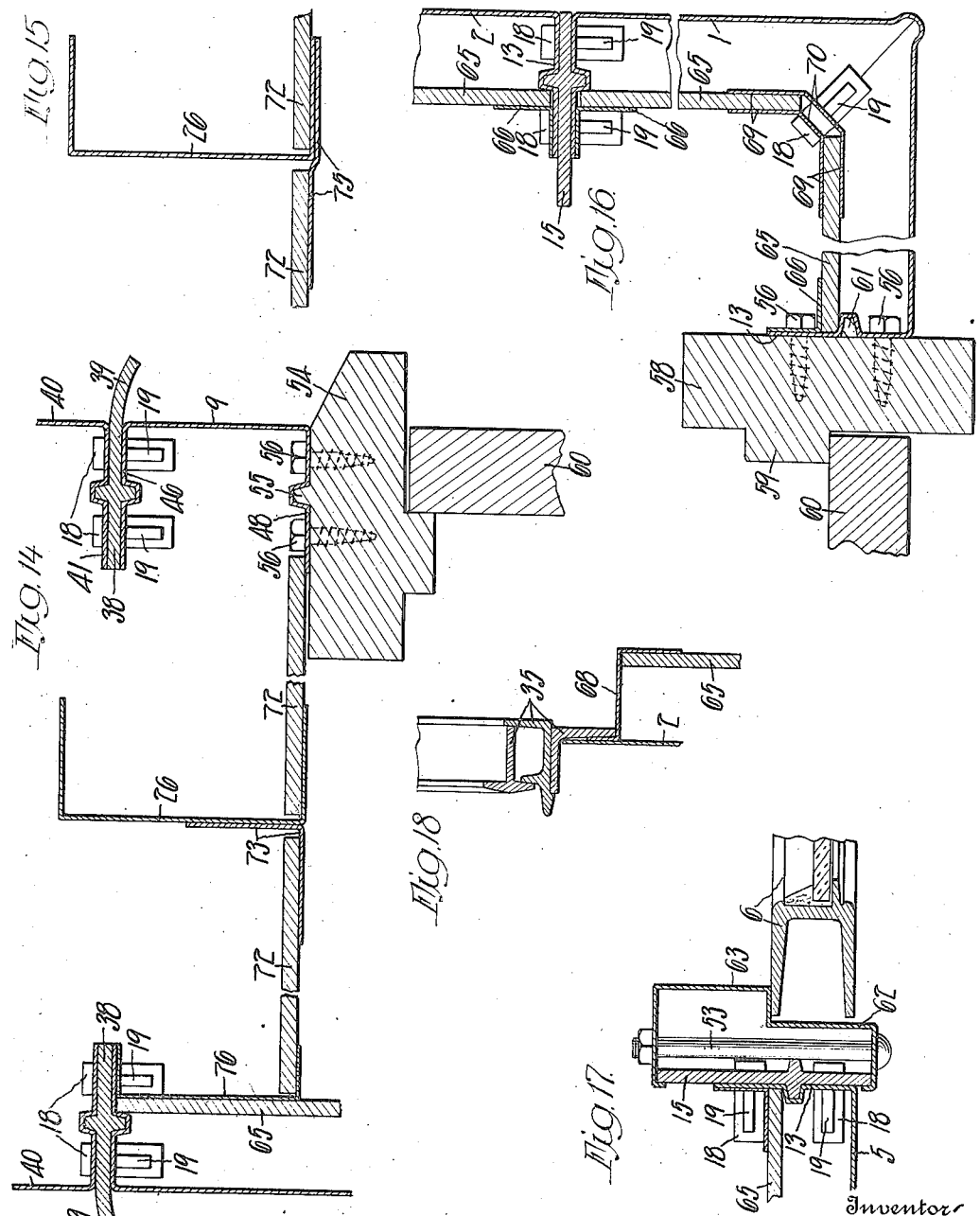

THOMAS H. KANE, OF YOUNGSTOWN, OHIO, ASSIGNOR TO TRUSSED CONCRETE STEEL COMPANY, OF DETROIT, MICHIGAN, A CORPORATION OF MICHIGAN.

BUILDING CONSTRUCTION.

1,208,326.

Specification of Letters Patent.

Patented Dec. 12, 1916.

Application filed December 30, 1915. Serial No. 69,330.

*To all whom it may concern:*

Be it known that I, THOMAS H. KANE, a citizen of the United States, residing at Youngstown, in the county of Mahoning and State of Ohio, have invented a new and useful Building Construction, of which the following is a specification.

The present invention relates to a metal building, particularly suitable for portable or temporary hospitals and schools, election booths and the like, and its object, briefly stated, is to provide very cheaply a construction that possesses, in greater measure than structures heretofore known, adaptability for size and special conditions, ease of erection, compactness for transportation and general capacity for service.

Among the important features of the invention are the following:—a sheet metal side wall panel, a sheet metal end wall panel, each of the panels having vertical edge flanges bent at an angle to the plane of the corresponding wall, together with short posts, of less height than the flanges of the side wall panels, interposed between the corner panels and adjacent side wall panels, and a roof support received between and detachably secured to the flanges of the corner and side panels; roof trusses including end gusset plates received between the flanges of the side wall panels and sheet metal truss members including a web and a flange, the end of the latter being bent into the plane of the web and welded to the corresponding gussets; a similar suspender construction for connecting upper and lower truss members; an improved sheet metal gable end; a horizontal bar extending across and joining the upper ends of the end wall panels, together with a door frame in the end wall and a filler panel between the horizontal bar and the door frame; a door frame having convenient means whereby it may be attached to or detached from the posts; an improved double panel wall construction whereby dead air spaces are formed; and an improved ceiling construction.

The invention also consists in the details of construction shown, described and claimed, and in an improved process whereby the building is erected.

In the drawings, Figure 1 is a fragmentary transverse vertical section through the building, said section being on either of the lines 1—1 of Fig. 5; Fig. 2 is a similar view, showing one manner of attaching windows to the panels. Fig. 3 is a fragmentary vertical section on the line 3—3 of Fig. 1, showing an end panel and the truss bracing. Fig. 4 is an end view of the building. Fig. 5 is a diagrammatic horizontal section showing the relations of the panels to one another. Fig. 6 shows several corner panels in diagrammatic horizontal section. Fig. 7 is a similar view of the side panels. Fig. 8 is an enlarged fragmentary horizontal section at one of the corners of the building on about either the line 8—8 or 8ª—8ª of Fig. 1. Fig. 9 is a fragmentary horizontal section showing a modified form of panel and joint key. Fig. 10 is a similar view of a second modification. Fig. 11 is a perspective view of one of the plates for the gable end. Fig. 12 is a section on the line 12—12 of Fig. 4. Fig. 13 is a section on the line 13—13 of Fig. 4, showing a metal door frame, a filler panel and a ceiling plate. Fig. 14 is a similar view through the whole length of the building, parts being broken away and modifications being shown. Fig. 15 is a vertical section, showing a modified construction for supporting the ceiling plates. Fig. 16 is a horizontal section showing a lining for the panels and also showing a wooden door frame. Fig. 17 is a similar fragmentary section showing a metal door frame. Fig. 18 is a section corresponding to Fig. 2, showing one manner of lining the window panel.

As shown diagrammatically in Figs. 4 and 5, the external wall surface of the building is formed, for the most part, of corner panels, 1, side panels 2, side panels 3 (which differ from the panels 2 merely in that windows or ventilators are omitted) end panels 4, narrow end panels 5 (if desired, Fig. 5) doors 6, gable ends 8 and filler plates 9 above the doors. The panels are all formed of thin sheet metal, and those designated 1, 2, 3 and 4 include the inturned bottom flanges 10 (Figs. 1, 8, 9, 10) that rest on sills 11 (preferably wood) and may be secured thereto by screws 12. It will be noticed (Fig. 8) that the corner panels are bent from a single sheet of metal, the flange 10 having been notched in an obvious manner. Each of the panels 1—2—3—4 has its side edges bent inwardly to form flanges 13 grooved at 14, and adjacent panels 1—2—3 are joined throughout a portion of their height by thin metal posts or key plates 15, having ribs 16 received in the grooves 14. By perforating the flanges 13 and the posts and providing slotted bolts 18 and wedges 19, a very convenient means is afforded for clamping the parts tightly together to exclude air and rain.

Resting directly on the upper ends of the members of each pair of posts are gusset plates 21 having ribs 22 (Fig. 1) conforming to and in alinement with the ribs on the posts, and to these gusset plates are joined sheet metal rafters (each of which may include an upper flange 23, a web 24 and a lower flange 25) and sheet metal ties 26, preferably of channel cross-section. Sheet metal channel suspenders or intermediate members 28 are used to join the peaks of the rafters to an intermediate point of a corresponding tie. The various joints between the gussets and suspenders and the rafters and tie are preferably formed by spot welding; and, in order to provide a large surface of contact, the flanges 25, together with the flanges of the suspenders, are, bent out into the plane of the web of the corresponding member as indicated respectively at 30 and 31 (Figs. 1 and 3). The members 23—24—25 and 26 constitute, respectively, the compression and tension chords of the roof truss. If desired, the peaks and ties of adjacent trusses may be connected by sheet metal sway braces 32 also welded in place (Fig. 3). The gussets preferably include outwardly projecting eave supporting extensions 33 (Fig. 1).

It will be observed that the posts or key plates 15 terminate some distance below the roof and that the panels 1—2—3 extend upwardly thereto and are each provided with a flange 34 that lies substantially in the plane of the upper faces of the rafters. (Fig. 1.) When the gussets are in position and the plates are joined thereto by wedge bolts 18—19, as heretofore explained, a tight weatherproof joint is therefore secured throughout the height of the side wall. As shown in Fig. 2, the panels 2 have window frames and tilting sashes indicated as a whole by 35.

The end panels differ from the panels 2, merely in that they have their upper edges bent to form a horizontal flange 36 (Fig. 3), grooved to conform to a ribbed horizontal bar 38, that extends across the building and is of the same cross-section as the posts, except that its edge 39 (which projects outwardly) is bent to form an inclined drip board. The sheet metal end gables are formed in two halves 40 (Figs. 3, 11, 12 and 13) each having a horizontal flange 41 conforming to the ribbed upper surface of the bar 38 and also having a flange 42 bent into the plane of the roof. Similar flanges 43 along the adjacent edges of the halves inclose a vertical stiffening bar 44 of the same cross-section as the posts. Wedge bolts 18—19 join the several parts as before. Projecting outwardly from the flanges 42 and preferably welded thereto (Fig. 3) are flat metal light-sealing plates 45, not shown in Fig. 4.

Referring now particularly to Figs. 4 and 13, it will be seen that the filler plate 9 has ribbed horizontal flanges 46 and 48 that conform respectively to the ribbed surfaces of the bar 38 and the lintel bar 49, the edges of the latter of which project beyond the flange 48. An upper sheet metal jamb plate 50 including edge flanges 51 and a stop portion 52 is detachably secured to the bar 49 by bolts 53. As the parts are clamped together by wedge bolts 18—19, the lintel bar and the joint plate may be said to be suspended from the bar 38. The depth of the plate 9 is such as to bring the upper edge of the door 6 below the eaves, from which it follows that the door may be readily inserted in lieu of one of the panels 2 or 3, they being of the same width. As indicated at the right side of Fig. 14, a wooden lintel bar 54 may be substituted for the metal lintel bar and jamb; it is preferred to provide a rib 55 to insure a tight joint when the screws 56 are entered. A wooden side frame member 58 having the stop 59 for the wooden door 60 and a rib 61 received in the groove of a panel, is shown in Fig. 16; and a metal post or side frame member 15 and jamb plate 62, including a stop 63, corresponding in cross section to the parts 49—51—52—53, appears in Fig. 17.

In certain cases (see Figs. 14, 16, 17 and 18) it is desirable to line the wall panels with asbestos or other boards 65 whereby dead air spaces are formed. This may be accomplished by crowding the boards against the ribs on the flanges 13 and retaining them in position by the sheet metal angle irons 66 through which the bolts 18 (or the screws 56) pass.

The boards 65 in the window panels 2 terminate at about the lower level of the windows and are covered by the flanged sheet metal closure plates 68 (Fig. 18) one flange of which extends up between the window frame and the rest of the panel and the other of which is turned down over the outer face of the board. At the corners (Fig. 16) the boards are joined by clamp plates having board gripping flanges 69 and body portions 70 through which wedge bolts 18—19 may be inserted to hold the parts firmly together.

Ceilings may also be formed by supporting a series of asbestos or other boards 72 (Fig. 14) on the lower flanges of the ties 26 and on sheet metal angle irons 73 or plates 75 (Fig 15) welded, respectively, to the webs and lower flanges of the ties. At the ends of the building, the ceiling plates may be supported on sheet metal hanger plates 76 (Fig. 14) (that lie flat against the boards 65 and are secured to the bars 38 by the bolts 18—19) and by the lintel structure (Figs. 13 and 14).

The roof covering may be of any approved character. That shown (Figs. 1 and 3) comprises ridge boards 71, intermediate roofing plates 72, end plates 73, eave plates 74 (having their edges bent down over the gusset extensions 33), key plates 75 and end roofing plates 76. The various plates of the roof are arranged in overlapping relation to each other and secured to the flanges 23 of the rafters by thin resilient metal clips 77, driven into place at an angle to the rafters and having two contact points that engage, respectively, with the upper face of the seams 78 (whereby the plates are joined) and the lower surface of the corresponding rafter flange.

In erecting the building, the end panels 4, the corner panels 1, the bars 39 and the gable ends 40 are preferably secured together while lying substantially flat. They are then tipped into the position shown, and a pair of posts, together with the adjacent side panels, assembled. The trusses are then elevated above the side panels and afterward lowered to bring the gussets into proper alinement with the posts and the corresponding bolts 18—19 are placed. Since, for hospitals and other portable buildings of twenty feet in width and with posts spaced approximately four feet, the weight of a truss need not exceed one hundred pounds, it is apparent that this manner of assembling the trusses is of much importance, as two men, one at each end, can place them without difficulty and without hoisting mechanism. The ends of the building may of course be assembled otherwise than as stated. The process of erection is thus continuous—panels, posts, panels, truss, in the order named—as opposed to the ordinary procedure in which a self-bracing framework is first erected and sheeting or walls afterward applied. It will be observed that the trusses are connected to the posts, only indirectly by means of the panels on each side.

Special corner panels 80 and 81, that differ from the panels 1 merely in the length of one or both wings, appear in Fig. 6, and special narrow side panels 82 are shown in Fig. 7. By the use of such panels, considerable latitude is allowed in locating the doors or determining external dimensions of the building. The posts may be replaced by round key bars 85 (Fig. 9) or by rectangular bars 86 (Fig. 10) and other shapes; and the roof trusses may take the form of girders in some instances. The panels may also be corrugated as indicated at 88 (Fig. 9) or embossed at 89 (Fig. 10) and provided with vertical ribs 90 whereby stiffness is secured.

It is also clear that many other changes may be made in the details of my invention; and I do not, therefore, wish to be limited otherwise than as indicated by the subjoined claims.

I claim:

1. A building comprising, in combination with wall panels, a roof truss that includes a metal rafter and a metal tie member having flat webs in substantially the same vertical plane, a thin gusset plate to which the end of the rafter and the tie member are rigidly joined, said gusset plate having an extension which projects beyond the wall panels, whereby eave plates may be supported.

2. A building comprising in combination with sheet metal wall panels, a roof truss that includes a sheet metal rafter and a sheet metal tie member having flat webs in substantially the same vertical plane, a thin gusset plate to which the webs of the rafter and tie member are welded, said gusset plate having an extension which projects beyond the wall panels, whereby eave plates may be supported.

3. A building comprising a plurality of roof trusses, spaced apart from each other, each of said trusses including a sheet metal compression chord and a sheet metal tension chord, said compression chords and said tension chords being arranged, respectively, in the same general planes, and a sheet metal sway brace extending from the compression chord of one of the trusses to the tension chord of the other, said sway brace including a web and a flange at an angle to each other, the ends of the flange being bent into the plane of the web and both web and flange being welded to the corresponding chords.

4. A building comprising an end including a plurality of sheet metal panels having alined flanges along their upper margins, a thin stiffener bar extending across said flanges, end sheet metal gable plates having flanges along their lower margins bearing on the stiffener bar, and means passing through said bar and the flanges of the panels and gable plates for detachably securing the parts together.

5. A building comprising an end including a plurality of sheet metal panels having alined grooved flanges along their upper margins, a thin stiffener bar extending across said flanges, end sheet metal gable plates having grooved flanges along their lower margins bearing on the stiffener bar, said bar having longitudinal ribs conforming to the grooves in the panels and gable plates, and means passing through said bar and the flanges of the panels and gable plates on each side of the ribs and grooves for detachably securing the parts together.

6. A building comprising an end including a plurality of sheet metal panels having alined flanges along their upper margins, a thin stiffener bar extending across said flanges, end sheet metal gable plates having flanges along their lower margins bearing on the stiffener bar, and means passing through said bar and the flanges of the panels and gable plates for detachably securing the parts together, said stiffener bar projecting beyond the plane of the end of the building to form a drip plate.

7. A building comprising a sheet metal end gable plate having a flange conforming to the plane of the roof, and a sheet metal light excluding plate secured to the flange and projecting outwardly beyond the end gable plate.

8. A building comprising sheet metal end gable plates of triangular shape, one of the edges of each plate being vertical, said plates having in-turned grooved flanges along the vertical edges, a vertical stiffening bar interposed between the edges, said bar having ribs conforming to the grooves of the flanges, and means passing through said bar and the flanges of the plates for detachably securing the parts together.

9. A building comprising an end including sheet metal panels, a horizontal stiffener bar extending across the upper ends of the panels, sheet metal gable plates resting on the cross bar, a door frame interposed between and of less height than the panels, a sheet metal filler for the space between the stiffener bar and the upper end of the door frame, and means for detachably securing the various parts together.

10. A building comprising an end including sheet metal panels, a horizontal stiffener bar extending across the upper ends of the panels, a door frame interposed between and of less height than the panels, a sheet metal filler for the space between the stiffener bar and the upper end of the door frame, said filler having flanges along its upper and lower edges conforming, respectively, to the stiffener bar and the door frame, and means passing through the flanges for detachably securing them to the stiffener bar and the frame.

11. A building comprising an end including sheet metal panels, a horizontal stiffener bar extending across the upper ends of the panels, a door frame interposed between and of less height than the panels, a sheet metal filler for the space between the stiffener bar and the upper end of the door frame, said filler having flanges along its upper and lower edges conforming, respectively, to the stiffener bar and the door frame, means passing through the stiffener bar and the upper flange of the filler for detachably securing them together, said door frame including a main horizontal frame bar, means for detachably securing the last mentioned bar to the lower flange of the filler, said bar projecting from the flange on each side thereof, and a sheet metal door jamb embracing the bar; and means for detachably securing the jamb to said bar.

12. A building comprising a wall panel having a flange in-turned along the vertical edge thereof, a main side bar of a door frame conforming and detachably secured to the flange, said bar projecting beyond the plane of the panel and the edge of the flange, a sheet metal door jamb embracing the bar, and means for detachably securing the jamb to said bar.

13. A building comprising sills, sheet metal side panels, sheet metal end panels, and a sheet metal corner panel, each of the panels having flanges formed along their vertical edges, thin metal posts interposed between the adjoining flanges and resting on said sills, means for detachably connecting the panels to the posts, each of the panels having a flange formed along its lower edge, said flanges also resting on the sills, the last mentioned flange of the corner panel being notched to allow bending of the portions of the panel at an angle to each other.

14. A building comprising a plurality of sheet metal wall panels, having body portions in the same general plane, said panels having grooved flanges along the adjoining edges thereof, thin metal bars interposed between the plates and having ribs that conform to the grooves therein, lining plates parallel to and spaced from the body portions of the panels, one side of said plates bearing on the grooved portions of the flanges of the panel corresponding thereto, a sheet metal angle iron having one flange parallel to a corresponding flange of a panel, its other flange lying against the corresponding lining plate, and means for detachably securing the angle bar, the flanges of the panels and the post together.

15. A building comprising a sheet metal wall panel having a flange formed along one of its vertical edges, a vertical member against which the flange bears, said flange having a rib on the side of the general plane thereof opposite the vertical member, a lining plate parallel to and spaced from the body of the panel, and having one side bearing against the rib, an angle having one flange lying against the vertical member and its other side lying against the lining plate, and means for detachably securing the angle bar to the vertical member.

16. A building comprising a sheet metal corner panel the body portions of which extend at an angle to each other, said panel having in-turned vertical edge flanges, said flanges each having a rib projecting therefrom, lining plates spaced from the corner panel and corresponding, respectively, to the body portion of the panel, said plates bearing against the ribs of the corresponding flanges, a pair of spaced sheet metal plates embracing the adjacent edges of the lining plates, means for detachably securing the last mentioned metal plates together, and detachable means for holding the lining plates in engagement with the ribs on the flanges.

17. A building comprising a sheet metal wall panel, a window frame supported and inclosed by the panel, a lining plate spaced from the wall panel, said plate extending up to substantially the lower level of the frame, and a sheet metal closure plate extending across between the lining plate and the lower portion of the frame.

In testimony whereof, I sign this application.

THOMAS H. KANE.